United States Patent Office 3,527,816
Patented Sept. 8, 1970

3,527,816
OLEFINIC ALCOHOLS
John R. Norell, Bartlesville, Okla., assignor to Phillips Petroleum Company, a corporation of Delaware
No Drawing. Original application Oct. 22, 1965, Ser. No. 502,332, now Patent No. 3,433,928, dated Mar. 18, 1969. Divided and this application July 29, 1968, Ser. No. 748,162
Int. Cl. C07c 35/00; C08g 17/00
U.S. Cl. 260—617
6 Claims

ABSTRACT OF THE DISCLOSURE

Novel esters such as 1-(3-cyclohexen-1-yl)-2-(acetoxycyclohexyl)ethylene and alcohols such as 1,2-bis(4-hydroxycyclohexyl)ethylene are formed from 1,2-bis(3-cyclohexen-1-yl)ethylene and derivatives thereof. The esters are useful as plasticizers and the alcohols are useful as intermediates in the formation of polyesters and polyurethanes.

This is a division of application Ser. No. 502,332, filed Oct. 22, 1965, now U.S. Pat. 3,433,928, issued Mar. 18, 1969.

This invention relates to a process for the esterification of novel triolefins and also to the esters formed in said process. In another aspect this invention relates to the formation of alcohols by the saponification of said novel esters. In another aspect this invention relates to the hydrogenation of those alcohols possessing olefinic unsaturation. In another aspect this invention relates to a process for the esterification of 1,2-bis(3-cyclohexen-1-yl)-ethylene.

According to the invention, novel compounds are prepared by esterifying triolefins characterized by the following formula:

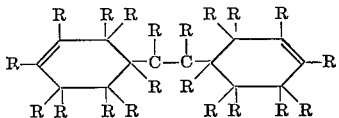

where R is at least one member selected from the group consisting of hydrogen, methyl and ethyl, the total number of carbon atoms in all of said R's preferably being not greater than 8.

The preparation of these triolefins is described in a copending application of D. L. Crain, Ser. No. 502,544, filed Oct. 22, 1965, now abandoned and its continuation-in-part application Ser. No. 665,239, filed Sept. 5, 1967, now U.S. Pat. 3,463,828, issued Aug. 26, 1969, assigned to a common assignee, Phillips Petroleum Company of Bartlesville, Okla.

These triolefins can be prepared by contacting an alkenyl-substituted cycloalkene with an alumina-supported molybdenum or tungsten catalyst at a temperature ranging from 25-300° C. and under a pressure ranging from 0 to 1500 p.s.i.g. Above-identified U.S. Pat. 3,463,828 contains a disclosure of preparing these triolefins in greater detail.

It is also within the scope of the present invention that these novel esters can then be saponified to form the mono-ols, diols, and/or triols. Furthermore, it is within the scope of this invention that the mono-ols and/or diols can be hydrogenated to form saturated mono-ols and/or diols.

Specific examples of those materials which can be used as the starting material in the esterification are as follows:

1,2-bis(3-cyclohexen-1-yl)ethylene
1,2-bis(1-methyl-3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl-)ethylene
1,2-bis(5-ethyl-3-cyclohexen-1-yl)ethylene
1,2-bis(6,6-dimethyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
1,2-bis(1,3-dimethyl-3-cyclohexen-1-yl)ethylene
2,3-bis(4-methyl-3-cyclohexen-1-yl)-2-butene
1,2bis(1,4-dimethyl-3-cyclohexen-1-yl)ethylene
1,2-bis(5,6-dimethyl-3-cyclohexen-1-yl)ethylene
2,3-bis(1,3,4-trimethyl-3-cyclohexen-1-yl)-2-butene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)-ethylene
1-(3-cyclohexen-1-yl)-2-(2-methyl-3-cyclohexen-1-yl)ethylene.

The acids which can be employed as one of the reactants in the practice of this invention are represented by the formula

wherein R' is selected from the group consisting of hydrogen and alkyl, aryl, and cycloalkyl radicals and combinations thereof such as alkaryl and aralkyl radicals, and alpha-haloalkyl radicals, each of said radicals containing from 1 to 10 carbon atoms inclusive.

Specific examples of acids which can be employed are formic acid, acetic acid, propionic acid, isobutyric acid, n-octanoic acid, n-decanoic acid, n-undecanoic acid, benzoic acid, 4-n-butylbenzoic acid, cyclohexanecarboxylic acid, 5-phenylvaleric acid, chloroacetic acid, trichloroacetic acid, dibromoacetic acid, trifluoroacetic acid, and the like.

Catalysts that can be used for this purpose are the acid-type, for example, sulfuric acid, boron trifluoride, boron trifluoride-ether complex, stannic chloride and ferric chloride.

Diluents that can be employed if desired include chloroform, carbon tetrachloride, and 1,1,2-trichloroethane. The choice of diluent will depend upon the particular organic acid chosen, but whatever diluent is used, both the triene reactant and the organic acid reactant should be soluble in the diluent. The amount of diluent employed can vary over a wide range, but will generally range from 100-1500 ml. per mol of triene being reacted. If desired, the acid reactant can serve as a diluent.

In forming the mono-, di-, and/or triesters, the reaction temperature will generally range from 20-120° C. with the preferred range being from about 50-70° C., when a catalyst is employed. In those situations wherein the reaction is carried out in the absence of a catalyst, the preferred temperature range is from about 70-100° C. The amount of catalyst employed can vary widely, but will generally range from about 1-10 weight percent based on the 1,2-bis(3-cyclohexen-1-yl)ethylene. The reaction time for formation of the mono-, di-, and/or triesters can range from a few minutes up to several days, but generally will range from about 10-30 hours.

Although the monoesters predominate at low acid:triene mol ratios such as 1:1 or less, higher acid:triene mol ratios such as 2:1 give diesters as the principal products; substantial amounts of the triesters are produced with further increase of the acid:triene ratio. Less reactive acids often yield the monoesters as the major product even though an excess of acid is used. As the cycloolefinic double bonds tend to be more reactive than the ethylenic double bond in this process, the major amount of the monoesters and diesters will generally be those in which the ethylenic double bond remains intact. Saponification of these esters by the process of this invention results in the formation of the corresponding mono-ols, diols, and triols. In the process of this invention, formic acid is the preferred reacting acid if one is to prepare alcohols in a subsequent saponification step. If the esters themselves are the desired products, the chosen acid will depend upon the desired properties such as boiling point, etc., of the esters.

Examples of esters produced according to the above-described process consist of compounds characterized by the following formulas:

monoesters having the formulas

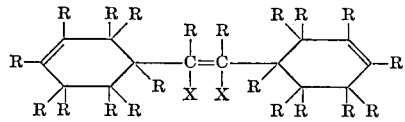

and

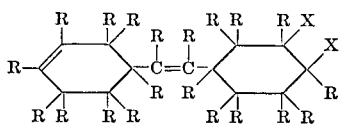

diesters having the formulas

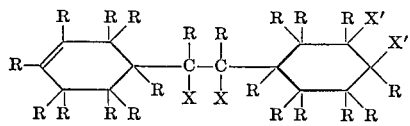

and

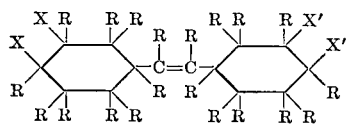

and triesters having the formula

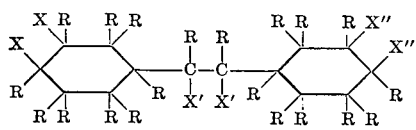

where R is at least one member selected from the group consisting of hydrogen, methyl and ethyl, the total number of carbon atoms in all of said R's being not greater than 8; and each X, X' and X" is a member selected from the group consisting of

and hydrogen, one and only one X, one and only one X', and one and only one X" being

where R' is a member selected from the group consisting of hydrogen and alkyl, aryl, and cycloalkyl, alkaryl, aralkyl, and alpha-haloalkyl radicals, each of said radicals containing not more than 10 carbon atoms.

It is to be understood that the esters which are produced by the process of this invention are formed as mixtures from which the pure compounds can be recovered by suitable means. For example, the reaction of bis(3-cyclohexenyl-1-yl)ethylene and derivatives with formic acid and other acids according to the process of this invention gives the following compounds:

1-formyloxy-1,2-bis(3-cyclohexen-1-yl)ethane
1-(3-cyclohexen-1-yl)-2-(3-formyloxycyclohexyl)ethylene
1-(3-cyclohexen-1-yl)-2-(4-formyloxycyclohexyl)ethylene
1-formyloxy-1-(3-cyclohexen-1-yl)-2-(3-formyloxycyclohexyl)ethane
1-formyloxy-1-(3-cyclohexen-1-yl)-2-(4-formyloxycyclohexyl)ethane
1-formyloxy-1-(3-formyloxycyclohexyl)-2-(3-cyclohexen-1-yl)ethane
1-formyloxy-1-(4-formyloxycyclohexyl)-2-(3-cyclohexen-1-yl)ethane
1,2-bis(3-formyloxycyclohexyl)ethylene
1,2-bis(4-formyloxycyclohexyl)ethylene
1-(3-formyloxycyclohexyl)-2-(4-formyloxycyclohexyl)ethylene
1-formyloxy-1,2-bis(3-formyloxycyclohexyl)ethane
1-formyloxy-1,2-bis(4-formyloxycyclohexyl)ethane
1-formyloxy-1-(3-formyloxycyclohexyl)-2-(4-formyloxycyclohexyl)ethane
1-formyloxy-1-(4-formyloxycyclohexyl)-2-(3-formyloxycyclohexyl)ethane
1-acetoxy-1,2-bis(3-cyclohexen-1-yl)ethane
1-(3-cyclohexen-1-yl)-2-(3-acetoxycyclohexyl)ethylene
1-(3-cyclohexen-1-yl)-2-(4-acetoxycyclohexyl)ethylene
1,2-bis(3-acetoxycyclohexyl)ethylene
1,2-bis(4-acetoxycyclohexyl)ethylene
1-(3-acetoxycyclohexyl)-2-(4-acetoxycyclohexyl)ethylene
1-acetoxy-1,2-bis(3-acetoxycyclohexyl)ethane
1-(chloroacetoxy)-1,2-bis(3-cyclohexen-1-yl)ethane
1-(3-cyclohexen-1-yl)-2-[3-(chloroacetoxy)cyclohexyl]ethylene
1-(3-cyclohexen-1-yl)-2-[4-(chloroacetoxy)cyclohexyl]ethylene
1,2-bis[3-(chloroacetoxy)cyclohexyl]ethylene
1,2-bis[4-(chloroacetoxy)cyclohexyl]ethylene
1-[3-(chloroacetoxy)cyclohexyl]-2-[4-(chloroacetoxy)cyclohexyl]ethylene
1-(3-cyclohexen-1-yl)-2-[3-(dibromoacetoxy)cyclohexyl]ethylene
1-(3-cyclohexen-1-yl)-2-[4-(trifluoroacetoxy)cyclohexyl]ethylene
1-(6-methyl-3-cyclohexen-1-yl)-2-(3-butyrloxycyclohexyl)ethylene
1,2-bis(3-ethyl-5-hexanoyloxycyclohexyl)ethylene
2-(3-methyl-3-cyclohexen-1-yl)-3-(3-methyl-4-undecanoyloxycyclohexyl)-2-butene
3-(2,2-dimethyl-3-cyclohexen-1-yl)-4-(2,2-dimethyl-3-benzoyloxycyclohexyl)-3-hexene
1-(1-methyl-4-ethyl-3-cyclohexen-1-yl)-2-(1-ethyl-3-methyl-4-cyclopentanoyloxycyclohexyl)ethylene
1-(3-cyclohexen-1-yl)-2-(3-p-toluoyloxycyclohexyl)ethylene
1-(3-cyclohexen-1-yl)-2-[4-(phenylacetoxy)cyclohexyl]ethylene As described hereinabove, it is also within the scope of this invention to convert these esters to alcohols, including the mono-ols, diols, triols, and mixtures thereof by saponification with a base. Suitable bases include sodium hydroxide and potassium hydroxide. The amount of base present should be at least one equivalent per ester group present in the ester being saponified and can range as high as 3*5 equivalents per ester group present. This saponification is preferably carried out in an aqueous system using about 500–1500 ml. of water per mol of ester being saponified. The saponification is carried out at temperature generally ranging from 50–120° C. and a period of time generally ranging from a few minutes to several days, and more usually less than 24 hours.

Following saponification, the produced alcohols can be recovered from the reaction mixture by such methods as fractional crystallization, distillation, solvent extraction, and the like.

The alcohols produced by the saponification of the esters can be characterized by the following formulas:

mono-ols having the formulas

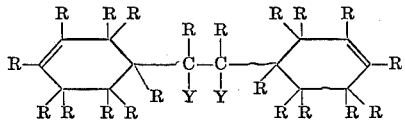

and

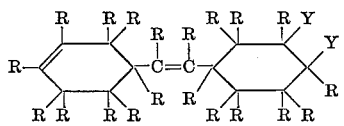

and diols having the formulas

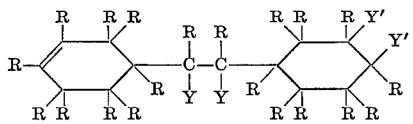

and

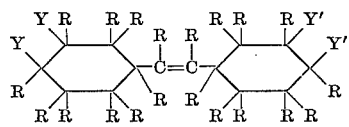

and triols having the formula

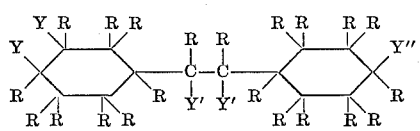

where R is at least one member selected from the group consisting of hydrogen, and methyl and ethyl, the total number of carbon atoms in all of said R groups preferably being not greater than 8; and each Y, Y' and Y'' is a member selected from the group consisting of hydroxyl and hydrogen, one and only one Y, one and only one Y', and one and only one Y'' being hydroxyl.

Specific examples of these compounds are as follows:

1-hydroxy-1,2-bis(3-cyclohexen-1-yl)ethane
1-(3-cyclohexen-1-yl)-2-(3-hydroxycyclohexyl)ethylene
1-(3-cyclohexen-1-yl)-2-(4-hydroxycyclohexyl)ethylene
1-hydroxy-1-(3-cyclohexen-1-yl) - 2 - (3 - hydroxycyclohexyl)ethane
1-hydroxy-1-(3-cyclohexen-1-yl) - 2 - (4 - hydroxycyclohexyl)ethane
1-hydroxy-1-(3-hydroxycyclohexyl) - 2 - (3 - cyclohexen-1yl)ethane
1-hydroxy-1-(4-hydroxycyclohexyl) - 2 - (3 - cyclohexen-1-yl)ethane
1,2-is(3-hydroxycyclohexyl)ethylene
1,2-bis(4-hydroxycyclohexyl)ethylene
1-(3-hydroxycyclohexyl)-2 - (4-hydroxycyclohexyl)ethylene
1-hydroxy-1,2-bis(3-hydroxycyclohexyl)ethane
1-hydroxy-1,2-bis(4-hydroxycyclohexyl)ethane
1-hydroxy - 1 - (3 - hydroxycyclohexyl) - 2 - (4 - hydroxycyclohexyl)ethane
1-hydroxy-1 - (4 - hydroxycyclohexyl) - 2 - (3 - hydroxycyclohexyl)ethane
1-(6-methyl-3-cyclohexen - 1 - yl) - 2 - (3 - hydroxycyclohexyl)ethylene
1,2-bis(3-ethyl-5-hydroxycyclohexyl)ethylene
2-(3-methyl-3-cyclohexen-1-yl) - 3 - (3 - methyl - 4 - hydroxycyclohexyl)-2-butene
3-(2,2-dimethyl-3-cyclohexen-1-yl) - 4 - (2,2 - dimethyl - 3-hydroxycyclohexyl)-3-hexene
1-(1-methyl-4-ethyl-3-cyclohexen-1-yl) - 2 - (1 - ethyl - 3 - methyl-4-hydroxycyclohexyl)ethylene It is further within the scope of this invention that those alcohols possessing olefinic unsaturation can be hydrogenated by passing them over a catalyst which is selected from the group consisting of platinum, palladium, Raney nickel, or the like. This hydrogenation can be carried out in any of the conventional solvents such as ethanol, dioxane, tetrahydrofuran, or the like. The hydrogenation temperature can vary over a wide range; however, it will usually be within the range of about room temperature to about 100° C. The hydrogenation pressure can be as high as 2000 p.s.i.g. or higher; however, it is usually maintained within the range of about atmospheric pressure to about 200 p.s.i.g.

The esters prepared by the process of this invention are useful as plasticizers. The alcohols prepared by the saponification of these esters are useful as intermediates in the formation of polyesters and polyurethanes. The ethylenic double bond which is available in some of these alcohols is particularly valuable when the alcohols are to be used in the formation of polyesters and polyurethanes, as it provides a point of attack for crosslinking and other reactions.

The following specific examples are intended to illustrate the process by which novel esters and alcohols of this invention are prepared. However, it is not intended that the invention be limited to the specific features shown in these runs.

EXAMPLE I

A run was carried out in which 1,2-bis(3-cyclohexen-1-yl)ethylene was reacted with formic acid to produce formate esters according to the process of this invention. Formic acid (98–100 percent) (80 g., 1.74 mol) and 1,2-bis(3-cyclohexen-1-yl)ethylene (33.2 g., 0.18 mol) were placed in a 200 ml. 3-necked flask and heated at 100° C. without a solvent or catalyst for five hours, with stirring. The mixture was allowed to stand overnight and was then diluted with water and extracted with ether. The ether layer was washed with saturated sodium bicarbonate solution and then with water. The ether solution was dried over magnesium sulfate, and the solvent was removed, leaving as a residue 37.1 g. of a liquid which was distilled to give five fractions. Fraction 1 (11.6 g., B.P. 79–110° C./0.4 mm., $n_D^{20}$ 1.5087) was principally unreacted 1,2-bis(3-cyclohexen-1-yl)-ethylene. Fractions 2, 3 and 4 (11.8 g., B.P. 112–150° C./0.5–0.4 mm., $n_D^{20}$ 1.4996–1.4972) were primarily a mixture of 1-(3 - cyclohexen - 1 - yl) - 2 - (3 - formyloxycyclohexyl)ethylene and 1-(3-cyclohexen-1-yl)-2-(4-formyloxycyclohexyl)ethylene. Fraction 5 (8.0 g., B.P. 150–142° C./0.4–0.2 mm., $n_D^{20}$ 1.4920) was primarily a mixture of 1,2-bis(3-formyloxycyclohexyl)ethylene, 1,2-bis(4-formyloxycyclohexyl)ethylene, and 1-(3-formyloxycyclohexyl) - 2 - (4-formyloxycyclohexyl)ethylene. Nuclear magnetic resonance analysis of fraction 5 showed the ratio of formate hydrogens to olefinic hydrogens to be about 1.3:1, indicating the presence of about 20 mol percent triformate. About 90 percent of the olefinic protons were of the ethylenic type, the remainder being of the cycloolefinic type.

EXAMPLE II 1,2-bis(3-cyclohexen-1-yl)ethylene (18.8 g., 0.10 mol) was added slowly to a stirred solution of chloroform (75 ml.), 98–100 precent formic acid (50 g., 1.1 mol) and 10 drops of concentrated $H_2SO_4$ contained in a fully-equipped 200 ml. 3-necked flask at 60° C. The mixture assumed a deep violet coloration and was heated overnight at $CHCl_3$ reflux. The mixture was cooled and poured into an ice-$NaHCO_3$ mixture, and when neutralized, it was extracted with $CHCl_3$. The organic extracts were dried over $MgSO_4$, the solvent removed and the residue distilled to give 9.1 g (51.5 percent conversion) of starting 1,2-bis(3-cyclohexen-1-yl)ethylene and 8.8 g. of formate esters of the 1,2-bis(3-cyclohexen-1-yl)ethylene.

EXAMPLE III

A run was carried out in which 1,2-bis(3-cyclohexen-1-yl)ethylene was reacted with formic acid, in the presence of a catalyst, to form diesters according to the process of this invention.

In this run, a 2000 ml., 4-necked flask fitted with a stirrer, condenser, addition funnel and thermometer was charged with 550 ml. of chloroform, 550 grams of 98–100 percent formic acid and 35 ml. of $BF_3 \cdot (C_2H_5)_2O$ in that order. The contents of the flask were heated to 60–65° C. while stirring and 250 grams of 1,2-bis(3-cyclohexen-1-yl)ethylene was added to the mixture over a 1.5–2 hour period. The resulting violet-colored solution was stirred and maintained at reflux temperature (65° C.) for 12–15 hours.

Because of the volume of the solution, the product was worked up in two portions. After the material had been cooled to room temperature, half of the mixture was poured onto a slurry of ice and saturated sodium bicarbonate solution. The slurry contained approximately 200 grams of ice and 250 ml. sodium bicarbonate solution. The ice slurry was stirred vigorously while adding the reaction mixture to the slurry. The other half of the reaction mixture was treated in the same manner. The organic layer which separated was recovered and the aqueous layer in each treatment was extracted once with approximately 200 ml. of chloroform. This extract was added to the organic layer, after which the organic layer was again contacted with approximately 300 ml. of saturated sodium bicarbonate solution. After drying, the organic layer was charged to a rotary evaporator, and the chloroform was stripped off.

After removing the chloroform, the remaining material was distilled through a 12 inch Vigreaux column and 166 grams of diesters, boiling range 140–158° C. at 0.2 mm. mercury absolute pressure, was obtained. Further distillation of this material yielded a close-boiling fraction, boiling point 155–157° C. at 0.2 mm. mercury absolute pressure. The refractive index ($n_D^{20}$) of this fraction was 1.4972. This fraction was primarily a mixture of the diesters 1,2-bis(3-formyloxycyclohexyl)ethylene, 1,2-bis(4-formyloxycyclohexyl)ethylene, and 1-(3-formyloxycyclohexyl)-2-(4-formyloxycyclohexyl)ethylene. An elemental analysis of this material gave the following results.

*Elemental analysis.*—Calculated for $C_{16}H_{24}O_4$, wt. percent: C, 68.5; H, 8.6; O, 22.9. Found, wt. percent: C, 68.7; H, 8.6; O, 22.7 (by difference).

EXAMPLE IV

The diesters of Example III were saponified to form the corresponding diols in the following manner.

A mixture of 230 grams of the diesters from Example III with a solution of 120 grams of NaOH in 500 ml. of water was charged to a 1000 ml., 3-necked flask fitted with a stirrer, condenser and thermometer. The mixture was heated to 90–100° C. and maintained at this temperature while stirring for 12–15 hours. The heat source was then removed and stirring was continued until the mixture had cooled to 25° C. The stirrer was then removed, and the aqueous layer was carefully decanted from the very viscous organic layer. Approximately 500 ml. of water and approximately 25 ml. of concentrated HCl were added to the flask and the mixture was stirred. The ester layer was separated, and an additional 500 ml. of water was added, mixed and removed. Approximately 300 ml. of ethyl acetate was added to the flask, and the mixture was heated on a steam bath until all of the organic layer from the reaction was dissolved. The resulting hot solution was filtered and then cooled in a refrigerator overnight. Ninety-two grams of material, melting point 87–95° C., clear at 125° C., was obtained. When recrystallized from ethyl acetate a material melting at 119–124° C. was obtained. This material was primarily a mixture of the diols 1,2-bis(3-hydroxycyclohexyl)-ethylene, 1,2-bis(4-hydroxycyclohexyl)ethylene, and 1-(3-hydroxycyclohexyl)-2-(4-hydroxycyclohexyl)ethylene. An elemental analysis of this material gave the following results:

*Elemental analysis.*—Calculated for $C_{14}H_{24}O_2$, wt. percent: C, 75.0; H, 10.7; O, 14.3. Found, wt. percent: C, 74.7; H, 10.7; O, 14.6 (by difference).

EXAMPLE V

A run was carried out in which 1,2-bis(3-cyclohexen-1-yl)ethylene was reacted with acetic acid to form monoesters.

In this run, 20 grams (0.30 mol) of acetic acid and 5 grams of $BF_3 \cdot (C_2H_5)_2O$ were dissolved in 70 ml. of chloroform and heated to 60° C. At this time, 18.8 grams (0.1 mol) of 1,2-bis(3-cyclohexen-1-yl)ethylene was dissolved in 20 ml. of chloroform and added to the catalyst solution over a one hour period. The resulting mixture was heated to reflux (68° C.) for 6 hours, after which it was allowed to stand overnight and cool to room temperature. The solution was then poured into ice cold sodium bicarbonate solution as in the previous examples. The organic layer was separated, washed with water and dried, after which the chloroform was distilled. The remaining dark residue was distilled at 0.2 mm. mercury absolute pressure, yielding five fractions which boiled at 70–71, 71–97, 113–121, 121–130, and 130–167, all temperatures being given in degrees C. The last three fractions were combined and redistilled, and a fraction was taken which boiled at 125–130° C. at 0.2 mm. mercury absolute pressure. The refractive index ($n_D^{20}$) of this material was 1.4934. The following elemental analysis of the product clearly shows this material was a monoester fraction, which consisted primarily of a mixture of 1-(3-cyclohexen-1-yl)-2-(3-acetoxycyclohexyl)ethylene and 1-(3-cyclohexen-1-yl)-2-(4-acetoxycyclohexyl)ethylene.

*Elemental analysis.*—Calculated for $C_{16}H_{24}O_2$, wt. percent: C, 77.5; H, 9.7; O, 12.8. Found, wt. percent: C, 76.8; H, 9.8; O, 13.4 (by difference).

The calculated molecular weight for these monoesters is 248, and the measured molecular weight of the material which was subjected to elemental analysis was 245. The infrared spectrum showed a carbonyl band at 5.8 microns and a weak cyclohexyl band at 6.1 microns. The nuclear magnetic resonance spectrum showed evidence for an equal amount of cyclic non-terminal olefinic protons at 4.4 tau units and acyclic non-terminal olefinic protons at 4.6 tau units, indicating that the acetoxy group was primarily on a cyclohexyl ring and not on the ethylenic linkage.

EXAMPLE VI

A run was carried out in which 1,2-bis(3-cyclohexen-1-yl)ethylene was converted to the monoesters by reaction with chloroacetic acid.

In this run, 18.8 grams (0.1 mol) of 1,2-bis(3-cyclohexen-1-yl)ethylene was dissolved in 75 ml. of chloroform, and the resulting solution was heated to 35–40° C., after which 2.13 grams of $BF_3 \cdot (C_2H_5)_2O$ was added to this solution. A solution of 18.9 grams (0.20 mol) of chloroacetic acid dissolved in 35 ml. of chloroform was then added dropwise over a 20 minute period. The resulting solution was stirred at 40° C. for 6.5 hours, after which the reaction mixture was poured into ice cold sodium bicarbonate solution. The layers separated, and the organic layer was removed, washed with 150 ml. of sodium bicarbonate solution and dried. After the chloroform was removed, the 23.5 grams of residue remaining was distilled. A fraction was obtained which boiled at 135–140° C. at 0.2 mm. mercury absolute pressure. The refractive index ($n_D^{20}$) of this material was 1.5075. The following elemental analysis of this material clearly shows that the product was a monoester fraction, which consisted primarily of a mixture of 1-(3-cyclohexen-1-yl)-2-[3-(chloroacetoxy)cyclohexyl]ethylene and 1-(3-cyclohexen-1-yl)-2-[4-(chloroacetoxy)cyclohexyl]ethylene.

*Elemental analysis.*—Calculated for $C_{16}H_{23}ClO_2$, wt. percent: C, 68.0; H, 8.2; Cl, 12.5; O, 11.3. Found, wt. percent: C, 68.7; H, 8.2; Cl, 12.6; O, 10.5 (by difference).

EXAMPLE VII

The mixture of unsaturated diols from Example IV were converted to the saturated diols in the following manner. Eleven and two-tenths grams (0.05 mol) of the unsaturated diols was dissolved in 150 ml. of absolute ethanol and to this solution was added 0.1 gram of reduced platinum oxide catalyst. This solution was then subjected to hydrogenation in a Parr apparatus. After 79 hours at 25° C. and 50 p.s.i.g. initial hydrogen pressure, the pressure in the apparatus had fallen to 24 p.s.i.g. This was approximately equivalent to a hydrogen uptake of 0.05 mol. The solution was filtered to remove the catalyst, after which the ethanol was distilled. A waxy solid was obtained which was recrystallized from a mixture of n-hexane and ethyl acetate to give a white powdery material melting over the range 96–105° C. Elemental analysis confirmed this material to be a saturated diol product, which consisted primarily of a mixture of 1,2-bis(3-hydroxycyclohexyl)ethane, 1,2 - bis(4 - hydroxycyclohexyl) ethane, and 1-(3-hydroxycyclohexyl)-2-(4-hydroxycyclohexyl)ethane.

*Elemental analysis.*—Calculated for $C_{14}H_{26}O_2$, wt. percent: C, 74.3; H, 11.6; O, 14.2; molecular weight, 226. Found, wt. percent: C, 74.5; H, 11.5; O, 15.4; molecular weight, 230.

Obviously, many modifications and variations of the present invention are possible in the light of the above teachings. It is, therefore, to be understood that within the scope of the appending claims the invention may be practiced otherwise than is specifically described herein.

I claim:

1. An alcohol characterized by one of the following formulas: mono-ols having the formulas

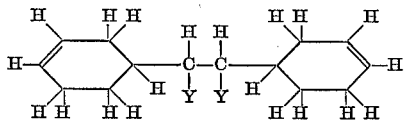

and

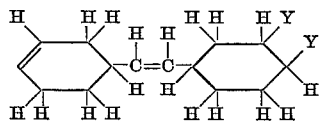

and diols having the formulas

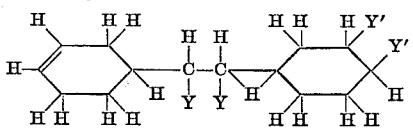

and

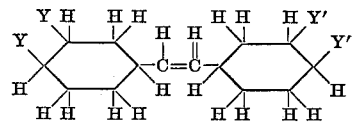

where each Y and Y' is a member selected from the group consisting of hydroxyl and hydrogen, one and only one Y and one and only Y' being hydroxyl.

2. An alcohol according to claim 1 which is 1,2-bis(4-hydroxycyclohexyl)ethylene.

3. An alcohol according to claim 1 which is 1,2-bis(3-hydroxycyclohexyl)ethylene.

4. An alcohol according to claim 1 which is 1,(3-hydroxycyclohexyl)-2-(4-hydroxycyclohexyl)ethylene.

5. An alcohol according to claim 1 which is 1-hydroxy-1,2-bis(3-cyclohexen-1-yl)ethane.

6. An alcohol according to claim 1 which is 1-hydroxy 1-(3-cyclohexen-1-yl)-2-(3-hydroxycyclohexyl)ethane.

References Cited

UNITED STATES PATENTS

| | | | |
|---|---|---|---|
| 2,198,046 | 4/1940 | Vierling | 260—487 X |
| 2,244,849 | 6/1941 | Olin | 260—617 XR |
| 2,350,361 | 6/1944 | Major | 260—631 |
| 2,392,864 | 1/1946 | Schoeller et al. | 260—617 X |
| 2,513,179 | 6/1950 | Johnson et al. | 260—617 R |
| 2,598,263 | 5/1952 | Johnson et al. | 260—497 X |
| 2,828,278 | 3/1958 | Kosmin | 260—617 X |
| 3,213,127 | 10/1965 | Jones et al. | 260—487 |

OTHER REFERENCES

Ghera et al.: "J. Am. Chem. Soc." vol. 84, pp. 2953–61 (1962).

LEON ZITVER, Primary Examiner

J. E. EVANS, Assistant Examiner

U.S. Cl. X.R.

260—75, 78, 487, 631